United States Patent

[11] 3,579,018

[72] Inventors Peter Whitten Ranby;
 David Richard Palowkar, London, England
[21] Appl. No. 817,367
[22] Filed Apr. 18, 1969
[45] Patented May 18, 1971
[73] Assignee British Lighting Industries Limited
 London, England
[32] Priority Apr. 30, 1968
[33] Great Britain
[31] 20,505/68

[54] LUMINESCENT MATERIALS
 4 Claims, 1 Drawing Fig.
[52] U.S. Cl....................................................... 313/109,
 252/301.6R, 313/108R
[51] Int. Cl....................................................... H01j 63/04

[50] Field of Search............................................ 252/301.4,
 301.6; 313/108 (R), 109

[56] References Cited
 UNITED STATES PATENTS
 2,227,418 1/1941 Addink........................ 252/301.4X
 2,312,266 2/1943 Roberts....................... 252/301.4
 2,590,411 3/1952 Isenberg...................... 252/301.6
 3,457,184 7/1969 Kobayashi et al............. 252/301.4

Primary Examiner—Raymond F. Hossfeld
Attorney—Owen J. Meegan

ABSTRACT: New phosphors, emitting a red fluorescence and suitable for use in high-pressure mercury vapor lamps, consist of zinc aluminate activated by chromium in which some of the alumina is replaced by boron oxide.

Patented May 18, 1971
3,579,018
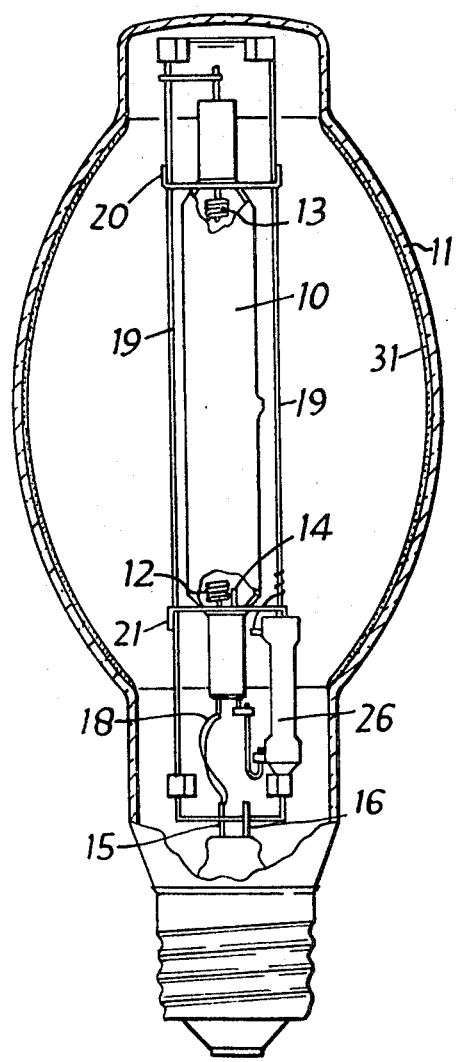
PETER WHITTEN RANBY
DAVID RICHARD PALOWKAR
INVENTORS
BY Owen J. Morgan
ATTORNEY

LUMINESCENT MATERIALS

The present invention relates to luminescent materials or phosphors, and provides a phosphor which is excited by ultraviolet, cathode and X-radiation and emits in the red region of the spectrum.

The phosphor according to the present invention is zinc aluminate activated by chromium and having the molecular composition 1 ZnO: 1.01—1.25 $Al_2O_3$: 0.002—0.04 $Cr_2O_3$ in which up to 0.4 mole of $Al_2O_3$ is replaced by $B_2O_3$.

It has been found that the incorporation of boron in the phosphor, for example as boron oxide, enables a luminescent phosphor to be prepared at a lower temperature than when no boron is present. Preferably, between 0.05 and 0.3 mole is so replaced by $B_2O_3$.

The phosphors of the invention emit a red fluorescence, the intensity of which increases as the temperature of the phosphor increases, and this makes the phosphor of particular value for use in devices which operate at above ambient temperature, for example high-pressure mercury vapor lamps.

The phosphors according to the invention can be prepared by heating together a mixture of the component oxides or compounds which decompose on heating to form the oxides and volatile byproducts. The materials used in the preparation should be of the high purity usual in the preparation of luminescent materials.

The following are examples of the practice of the invention.

EXAMPLE 1

A phosphor is prepared from the following:
80 g. ZnO
110 g. $Al_2O_3$
10 g. $H_3BO_3$
10 g. $(NH_4)_2SO_4.Cr_2(SO_4)_3.24H_2O$ These ingredients are intimately mixed together and then heated in air for 30 minutes at 1200° C. When cool, the product is ground and refired at 1240° C. for 6 hours. When cool the product can be ground, washed, and sieved. The resultant material has a pale pinkish body color and fluorescence a deep red color under ultraviolet. The fluorescence becomes of stronger intensity when the phosphor is warmed.

EXAMPLE 2

An alternative method of preparation uses the following:
44 g. ZnO
420 g. $Al_2(SO_4)_3.(NH_4)_2SO_4.24H_2O$
15 g. $H_3BO_3$
4.8 g. $(NH_4)_2SO_4.Cr_2(SO_4)_3.24H_2O$ These ingredients are intimately mixed together and heated to 1000° C. for 1 hour in air. When cool, the product is ground and then reheated for 3 hours at 1200° C. When cool, the product is ground, washed and sieved and is similar in body color and fluorescence to that described in the previous Example.

The accompanying drawing is a longitudinal section of one example of a high-pressure mercury vapor lamp containing a coating of the phosphor according to the invention.

In the lamp shown in the drawing an arc tube 10 surrounded by and spaced from a transparent outer envelope 11 contains main electrodes 12 and 13 at respective ends and an auxiliary electrode 14 near the electrode 12. The tube 10 also contains a conventional fill of a small drop of liquid mercury and a small amount of argon gas.

A lead-in wire 15 is connected to the electrode 12 by means of a metal ribbon 18 and a second lead-in wire 16 is connected to a U-shaped support wire 19 which by means of collars 20 and 21 supports the tube 10 within the outer envelope 11. The wire 19 is connected to the electrode 13 and also, through a resistor 26, to the auxiliary electrode 14.

A coating 31 of a phosphor according to the invention, for example one prepared as described in Example 1 or 2 above, is applied to the inner surface of the envelope 11 by conventional techniques.

We claim:

1. A phosphor composition corresponding to the molecular formula:

1 ZnO: 1.01—1.25 $Al_2O_3$: 0.002—0.04 $Cr_2O_3$ in which $Al_2O_3$ is replaced by $B_2O_3$ to the extent of up to 0.4 mole.

2. A composition according to claim 1 wherein between 0.05 and 0.3 mole of $Al_2O_3$ is replaced by $B_2O_3$.

3. A method of preparing a phosphor comprising the steps of:

preparing a mixture comprising compounds of zinc, aluminum, chromium an boron, said compounds being selected from oxides of said elements and compounds which decompose on heating to form such oxides and volatile byproducts, said mixture being formulated with proportions corresponding to 1.01—1.25 moles aluminum oxide and 0.002—0.04 mole chromous oxide per mole of zinc oxide, ad boron oxide in an amount replacing up to 0.4 mole aluminum oxide;

and heating said mixture to form a luminescent product.

4. A high-pressure mercury vapor lamp comprising:
   an arc tube;
   electrodes in said arc tube;
   a fill comprising inert gas and mercury vapor in said arc tube;
   a light-transmitting outer envelope surrounding and spaced from said arc tube;
   and a coating on a surface of said envelope comprising a boron-containing chromium-activated zinc aluminate phosphor having the molecular composition:
   1 ZnO: 1.01—1.25 $Al_2O_3$: 0.002—0.04 $Cr_2O_3$ in which up to 0.4 mole of $Al_2O_3$ is replaced by $B_2O_3$.